UNITED STATES PATENT OFFICE 2,489,692

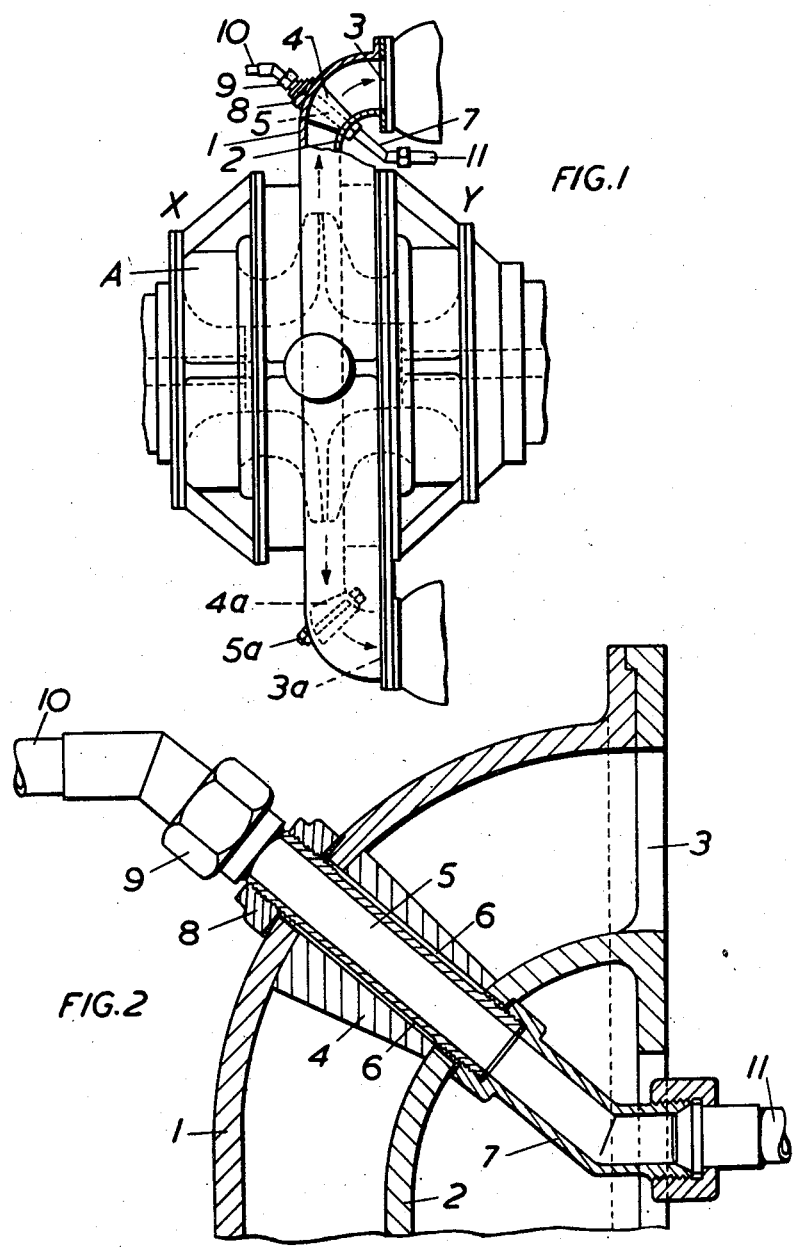

COMPRESSOR

Frank Whittle, Rugby, England, assignor to Power Jets (Research Development) Limited, London, England Application August 24, 1945, Serial No. 612,468
In Great Britain April 7, 1942

Section 1, Public Law 690, August 8, 1946
Patent expires April 7, 1962

4 Claims. (Cl. 230—132)

This invention relates to compressors, and especially to compressors of the centrifugal type which have static diffuser vanes provided in their casings. The invention is concerned with overcoming a difficulty which may arise, especially in such installations as aircraft installations where space is limited, in the leading of piping or ducts from one side of the compressor to the other for lubrication, air passage or other purposes. It is found in some cases to be inconvenient to lead piping outside the periphery of the compressor casing, because of space, exposure to cold, the possibility of mechanical damage, and so on. In the case for example of the centrifugal compressor of a Whittle type of gas turbine aero engine it may be required to lead an oil-pipe from a pump or other accessory on one side of the compressor casing to a bearing on the remote side; but it is undesirable that such a pipe should be exposed to very cold airflow or should virtually increase the overall dimensions of the engine.

According to this invention, a pipe or duct required to be led from one side to the other of a compressor casing is led through the casing walls and through the thickness of a static diffuser vane. The section which is led in this manner, may take the form of a hollow bolt or the like used in mounting the vane, and singled out as may be convenient from a series of ordinary bolts provided for this purpose. The bore of the bolt may form the actual pipe or duct for its length, appropriate connections being provided at each end for the remainder of the piping; or a pipe may be threaded through the bore, as may be deemed expedient. If it is anticipated that the diffuser vane will be hotter than is tolerable to the contents of the pipe, an insulative sleeve or an air space may be provided within the bore of the bolt, surrounding a section of pipe running through it. The device may be employed for ducting mechanical or electrical connections such as rods or cables.

An arrangement according to the present invention is illustrated in the accompanying diagrammatic drawings, in which:

Figure 1 is a side elevation partly in section of compressor with an arrangement according to the invention applied to it; while Figure 2 is a fragmentary sectional view showing the arrangement according to the invention in greater detail.

Referring first to Figure 1, the compressor A is represented as having two walls designated 1 and 2, respectively, extending radially from the axis of the compressor and swept round through 90° to outlet ports, two of which are shown at 3 and 3a.

Within the annular space between the walls 1 and 2 and held therein are diffuser vanes, one of which is shown in full lines in the sectional part at 4 and another in dotted lines at 4a. These vanes act as spacers for the walls and contribute to the rigidity thereof. The walls and vanes are held together by bolts, the one shown at 5a being of ordinary type, but where it is desired to pass one or more pipes or the like, from one side X of the compressor to the other side Y without going outside the periphery of the compressor casing, the bolt through an appropriate vane, such at 4, is made hollow as shown at 5 in Figure 2. Such bolts 5 preferably pass through the diffuser vanes 4 with a clearance seen at 6. Each end of the bolt is threaded and on one end a pipe union 7 is screwed on to the bolt 5 acting also as a nut whilst at the other end there is provided a nut 8 by which the bolt is drawn tight whilst this end also has a screwed pipe union nut 9. By these means supply piping 10 and 11 at the two sides of the compressor is interconnected through the bore of the bolt 5. Thus the bolt serves both as a bolt in the structural sense and also as a section of pipe for such use as may be required for example for lubricating oil as above mentioned.

I claim:

1. A centrifugal compressor comprising a casing having two walls and static diffuser vanes therein defining a passage for the fluid, a hollow bolt-like element interattaching said walls of the casing through a diffuser vane which acts as a spacer between the walls, said bolt-like element serving as a section of piping or ducting for such service as may be required.

2. A centrifugal compressor comprising a casing with radially co-extensive walls, fixed diffuser vanes between and spacing said walls, a plurality of bolts passing through said walls and said vanes to hold them together, at least one of said bolts being a hollow bolt constituting a passage from one side of said casing to the other.

3. A compressor according to claim 2, in which said hollow bolt has end connections for pipe unions.

4. A compressor according to claim 2 in which said hollow bolt is afforded clearance from the structure of the diffuser vane through which it passes.

FRANK WHITTLE.

REFERENCES CITED

The following references are of record in the file of this patent:

UNITED STATES PATENTS

| Number | Name | Date |
| --- | --- | --- |
| 1,879,561 | Smith | Sept. 27, 1932 |
| 2,050,385 | Schmidt | Aug. 11, 1936 |
| 2,157,002 | Moss | May 2, 1939 |